June 26, 1928.

Re. 17,007

H. E. HANSON

PLASTER BOARD

Original Filed Oct. 30, 1925

INVENTOR
HANS E. HANSON
BY
ATTORNEY

Reissued June 26, 1928. Re. 17,007

UNITED STATES PATENT OFFICE.

HANS E. HANSON, OF MINNEAPOLIS, MINNESOTA, ASSIGNOR, BY DIRECT AND MESNE ASSIGNMENTS, TO THE CELOTEX COMPANY, OF CHICAGO, ILLINOIS, A CORPORATION.

PLASTER BOARD.

Original application filed October 30, 1925, Serial No. 65,772. Renewed January 27, 1927. Original No. 1,651,951, dated December 6, 1927. Application for reissue filed March 21, 1928. Serial No. 263,488.

This invention relates to the art of building, and the primary object is to provide an improved construction of plaster wall, wherein the plaster is carried by a plaster base, which in turn is carried or supported by studdings or other means forming the rigid or central portion of the wall. A second object is to provide an improved, practical, and efficient form of plaster base, the same consisting of a series of panels or boards having roughened outer surfaces, to which the applied plaster will cling, and which are so constructed that they will tend to support or brace each other while in their permanent positions in the wall. Further and more specific objects will be disclosed in the course of the following specification, reference being had to the accompanying drawing, wherein:

Figure 1:
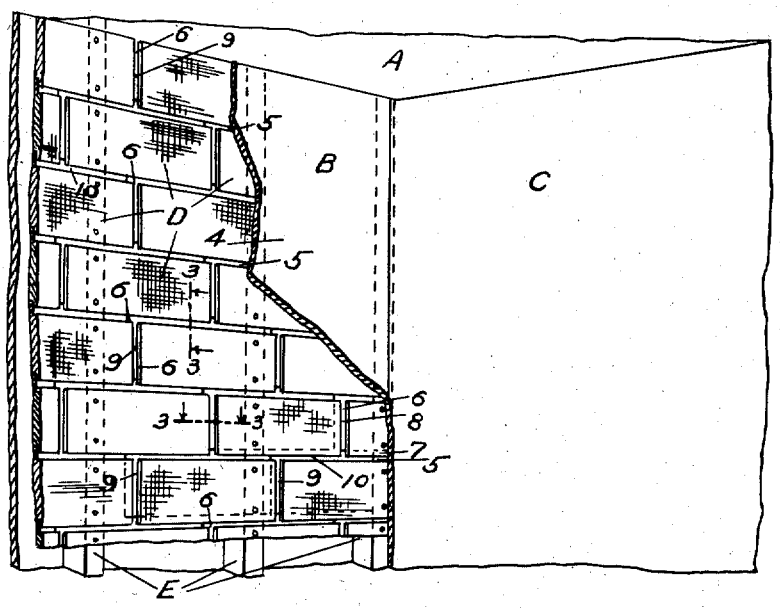
Fig. 1 is a perspective view of an upper corner portion of a room, showing the construction of the improved wall and the application of my improved plaster base.

Referring to the drawing more particularly and by reference characters A designates the ceiling of a room having walls B and C. The ceiling A and wall C are shown as fully plastered, while the wall B is only partly covered by plaster 4, so as to expose and illustrate my wall base structure, which is made up of boards or panels D, the same being nailed or otherwise suitably secured to the usual studdings E of the wall.

Figure 2:
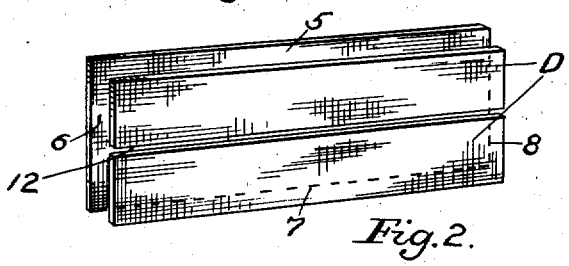
Fig. 2 is an enlarged detail perspective view of one of my improved plaster boards, the board here shown also illustrating a modification of the construction shown in Fig. 1.
Figure 3:
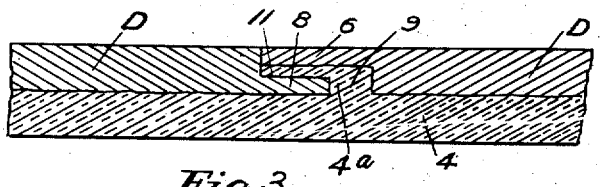
Fig. 3 is an enlarged detail section on either of the lines 3—3 in Fig. 1.

Although each board D is formed of a single piece of material, it presents the appearance of two rectangular sections or panels, one of which is diagonally offset from the other, with a result that the board or entire panel has an upwardly projecting rear flange or reduced portion 5, a corresponding rear end flange 6, and two opposed but front flanges 7 and 8. As shown in Fig. 3 the flange 6 of one board is wider than the flange 8 of the adjacent board, so as to leave a space or groove 9 when the boards are placed end to end. Similarly, the flange 7 is narrower than the flange 5, so as to leave a horizontal channel 10 between adjacent tiers of boards. It may also be noted that the total thicknesses of the flanges 6 and 8, or 5 and 7, is less than the thickness of a board, so that, in addition to the channel 9 (or 10) there will be left a space 11, between the overlapping flanges, so that the opening 9—11 will be substantially L-shaped in cross section, and as such will form very efficient keys $4^a$ in the plaster 4. Stated in other words, the opposed flanges 6 and 8 (or 5 and 7) of each board have different cross sectional areas, so that when they are complemented by similar flanges of adjacent boards they will leave channels for the reception of the plaster portions $4^a$, and, it may here be noted that these plaster portions $4^a$ not only serve as keys, but, as they also increase the thickness of the applied plaster sheet proper, at the board joints, they form reinforcing ribs or ridges for the plaster sheet, so as to lessen the possibility of the plaster cracking at the joints, such as might otherwise occur under distortional action of the boards D. When the boards are made in large sizes it is found very desirable to provide them with channels or grooves 12 in their faces, as shown in Fig. 2, which channels are similar in many respects to the grooves or spaces 9 and 10.

In constructing plaster board bases, as a substitute for the more expensive and slower method of lathing, it has been the custom to use plain sheets of the board, and preferably in large sizes, for convenience in applying, and such boards have been cut so as to meet, or substantially meet, at the studding centers, and at such ends were nailed to the studdings. They have no overlapping flanges at either ends or top and bottom and therefore the vertical edges, at least, must end at and be secured to the permanent uprights. Consequently, as the studding centers will seldom correspond with the horizontal dimensions of the boards, it is necessary to saw off the projecting ends, resulting in a great loss of material. Furthermore, if the fit of a board is tight or close an ordinary workman will seldom take the trouble to cut off enough to allow for an expansion space between the ends of the boards, with a result that as the outer surfaces of the boards become wet from the plaster, as the latter is applied, the entire wall will bulge and swell at least between the studdings, and such swelling is not only unsightly but may be very destructive, and require remaking the entire wall.

To overcome these and other difficulties and objections I have perfected the plaster base structure above described. By reason of the flanges 5, 6, 7, and 8, which overlap and reinforce each other, it is not necessary that the ends of the boards meet or terminate at the studdings and it is only necessary that the boards be cut possibly at one end or at the top or bottom of the wall, depending upon where the last boards of the wall are secured. In other words they can be nailed in place much in the same manner as the laying of hardwood floors or brick walls.

As the boards are comparatively small, or if large are provided with the channels 12, the spaces 9, 10, and 12 are sufficient to prevent noticeable swelling by moisture, especially as such moisture as is absorbed from the plaster is limited to a shallow depth immediately adjacent to the outer or roughened surface of the board. Furthermore the offset or staggered condition of the plaster keys 4ª insures the retention of the dried plaster sheet to the entire wall and thoroughly fills all the spaces between the adjacent boards, with the reinforcing advantages previously noted. Incidentally the overlapping flange arrangement insures a thorough insulation against the transmission of heat through the joints of the wall.

It may here be noted that while substantial swelling or bulging of the wall, by reason of moisture passing from the plaster into the base, is objectionable, it is not objectionable, but is, on the other hand, desirable, if not necessary, that the base will absorb such moisture, because that very process greatly assists in "setting" the plaster, and permits a heavier coat of plaster to be applied than if the base were non-porous. Furthermore, a non-porous or non-moisture-absorbable base would no doubt be so hard that it could not be penetrated by or secured with nails, and its cost would possibly be prohibitive.

It is understood that suitable modifications may be made in the general design and structural details of the invention, as herein disclosed, provided, however, that such modifications come within the spirit and scope of the appended claims. Having now therefore fully shown and described my invention, what I claim to be new and desire to protect by Letters Patent is:

1. A plaster base comprising a series of panels adapted to be arranged adjacent to each other in the same plane and having roughened outer surfaces for holding a sheet of plaster applied to the base, each of said panels being provided at opposite edges with reverse flanges adapted to overlap and complement similar flanges of adjoining panels, said complementing flanges being of different widths whereby channels will remain for the forming of keys in the sheet of plaster applied to the base.

2. In a wall, a series of adjoining boards having roughened plaster receiving surfaces, the adjoining ends of each two of said boards having overlapping flanges, the total of said overlapping flanges being less than the thickness of one of the boards.

3. In a wall, a plurality of adjoining rectangular moisture absorbable plaster boards having plaster adhering faces, a coat of plaster adhering to the faces, overlapping flanges extending from the edges of said boards, the opposite flanges of each board being of different widths, so as to form plaster key forming recesses.

4. In a structure of the character described, a wall, plaster covering the wall, said wall having a plaster adhering surface and horizontal and vertical channels in its outer face, whereby keys of said plaster will be formed in said channels, said channels being angularly formed whereby said keys will be substantially L-shaped in cross section.

5. In a structure of the character described, a wall, plaster covering the wall, said wall having a plaster adhering surface and horizontal and vertical channels in its outer face, whereby keys of said plaster will be formed in said channels, said wall comprising tiers of panels placed end to end in staggered relations with respect to the panels above and below, and the adjoining edges of all of said panels being provided with overlapping flanges, one each of which flanges is wider than that which it overlaps.

6. A plaster base comprising a series of panels adapted to be arranged adjacent to each other in the same plane and having roughened outer surfaces for holding a sheet of plaster applied to the base, each of said panels being provided at two opposite edges with reversely arranged reduced edge portions adapted to complement similar edge portions of other panels adjoining said edges, said complementing edge portions being of different widths whereby channels will remain for the forming of reinforcing ridges in the sheet of plaster applied to the base.

7. A plaster base, for a wall, comprising a plurality of panels arranged in tiers, with the panels of each tier in staggered relations with respect to the panels of the adjacent tiers, said plaster base having a plaster adhering surface and having horizontal and vertical channels in its outer face whereby reinforcing ribs will be formed in the plaster applied to the base, the adjoining horizontal edges of the panels being provided with overlapping reduced edge portions, one each of which edge portions is narrower than that which it overlaps.

8. A plaster base member having a plaster adhering outer surface and having opposite edges with reversely arranged reduced edge portions adapted to complement similar edge portions of other panels adjoining said edges, said complementing edge portions, having cross sections the area of one greater than the other, whereby the complementing edge portions when in juxtaposition form channels for the reception of plaster to thereby form reinforcing ridges in a sheet of plaster applied to the base.

Signed at Minneapolis, Minnesota, this 19th day of March, 1928.

HANS E. HANSON.